Oct. 10, 1950 F. J. HORATSCHKE ET AL 2,524,911
TIMBER JOINT
Filed Nov. 7, 1945 2 Sheets-Sheet 1
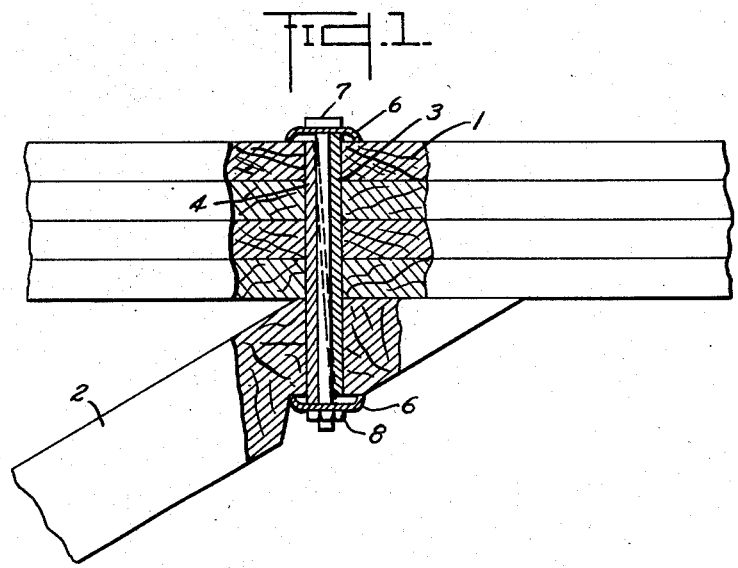
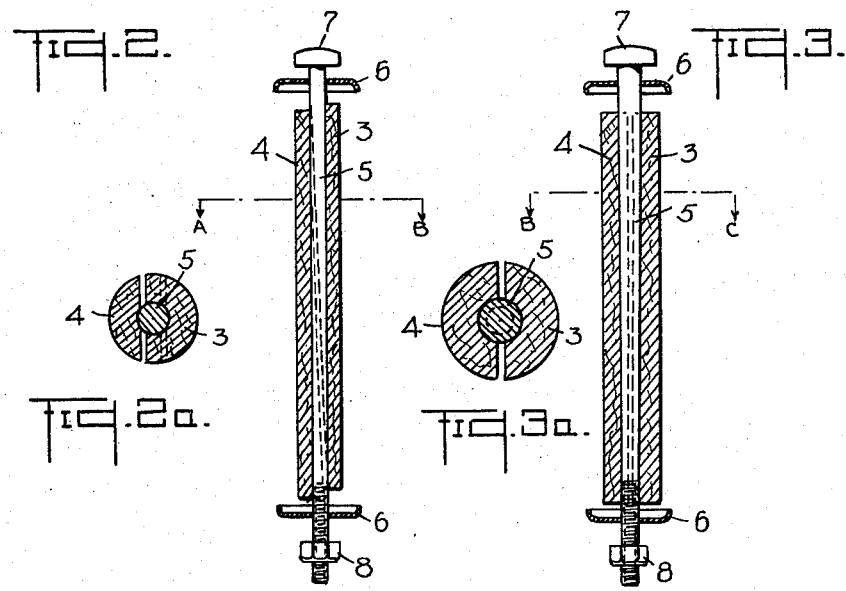
FRANCISCO JOSÉ HORATSCHKE
ROLF WOLDEMAR HERING
INVENTORS
BY
Richardson, David + Nordon
their ATTORNEYS Oct. 10, 1950  F. J. HORATSCHKE ET AL  2,524,911
TIMBER JOINT
Filed Nov. 7, 1945  2 Sheets-Sheet 2
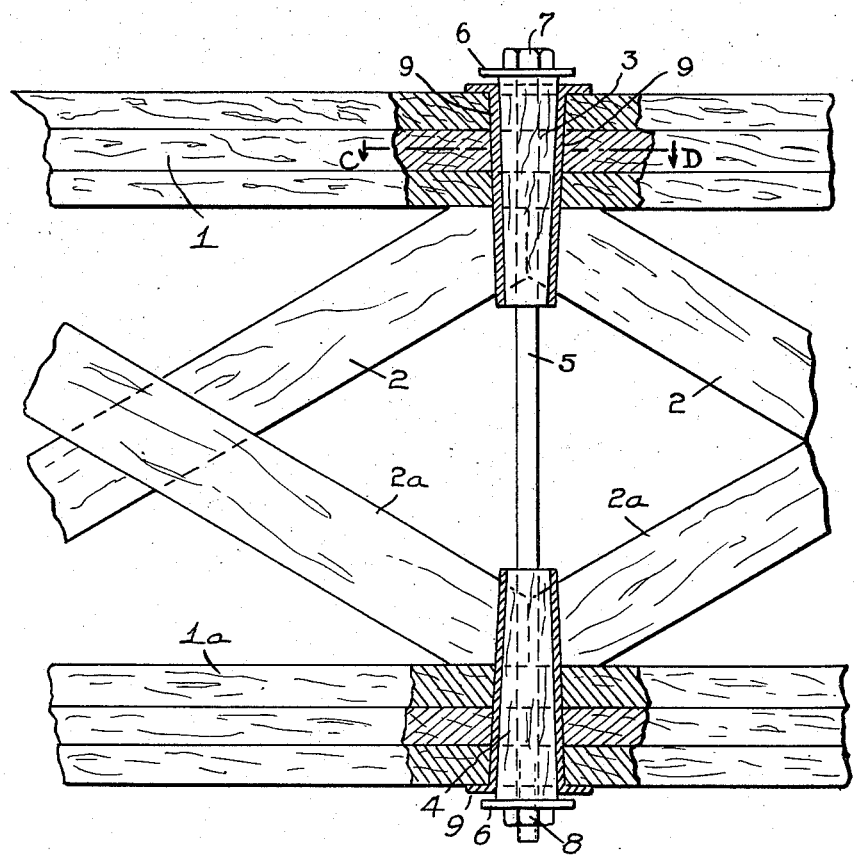
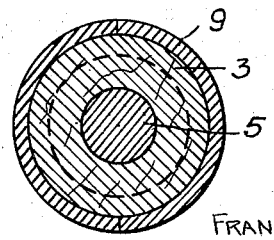
FRANCISCO JOSÉ HORATSCHKE
ROLF WOLDEMAR HERING
INVENTORS Patented Oct. 10, 1950

2,524,911

UNITED STATES PATENT OFFICE 2,524,911

TIMBER JOINT

Francisco José Horatschke and Rolf Woldemar Hering, Rio de Janeiro, Brazil

Application November 7, 1945, Serial No. 627,140
In Brazil November 22, 1944

1 Claim. (Cl. 20—92)

This invention relates to a novel and improved means for interconnecting structural members of wood such as beams, planks, trusses, braces and the like used in roof, bridge and similar wooden structures for large span.

The means used up to now for this purpose are mainly bolts made of iron or metal, and dowels made of wood. Both have their disadvantages, arising from the material of which they are made.

Furthermore, both show the most serious drawback that the joints made by means of either the one or the other become loose in use due to shrinkage of the wood of the structural members and of the dowel itself, if used instead of a metal bolt. It is well known that wood, even well seasoned, will shrink or contract in the course of time, for instance, due to further drying up, or crushing of wood cells under the high stresses developed in structures for large span, which shrinkage of the wood and consequent loosening of the joints will, in its cumulative effect, greatly impair the solidity and durability of the whole structure, producing in particular a dangerous flexure in the centre of the span of large structures.

It is, therefore, the principal object of the invention to eliminate this disadvantage by the provision of two complementary wooden dowel parts fitted tightly into the aligned holes of the timbers to be connected and having a longitudinal axial bore through which projects an iron or metal bolt which by its head portion and a nut screwed on to the threaded end of the bolt, with washers underneath both nut and head, holds the dowel parts and the timbers firmly together, thus making a complete tight joint, the various cooperating parts being so shaped and mutually arranged that upon subsequent loosening of the joint in use, due to shrinkage of the wood, further screwing down or the "resetting" of the nut will cause a relative movement of the dowel parts and the bolt so as to increase the total thickness of the dowel and bolt assembly and correspondingly increase the pressure exerted by the said assembly upon the side walls of the aligned holes in the timbers which permits at any time the controlled readjustment of the pressure in the joint to any desired degree and, thus, the re-tightening of the joints of the whole structure.

It is another object of the invention to provide a composite wood and metal connecting means as just described so as to use to advantage the desirable properties of both materials for the purpose in view and to offset the inherent deficiencies of one by the compensating properties of the other, thus assuring, for instance, maximum rigidity by the wooden dowel parts and obtaining by the metal bolt, maximum strength and safety in the two directions of interconnection.

The invention is illustrated by various embodiments given by way of example in the accompanying drawings in which identical or corresponding parts are designated by the same reference numbers.

Fig. 1 shows in section a built beam formed of planks 1 placed lengthwise, and a solid truss 2, the two members being fastened together by the composite connecting means according to the invention, consisting of the two complementary parts 3 and 4 forming a dowel body, and of the bolt 5 having a head 7 and a screw nut 8 with respective washers 6 underneath. For this joint there may be used the means shown in Fig. 2 or in Fig. 3.

Fig. 2 illustrates in longitudinal section and in greater detail one form of the novel and improved composite wood and metal connecting means according to the invention, Fig. 2a being a cross section thereof along A—B, viewed from above.

Fig. 3 illustrates also in longitudinal section and in detail another form of the connecting means according to the invention, Fig. 3a being a cross section thereof along B—C, viewed from above.

Fig. 4 illustrates specifically, in section, a further modified form of the composite wooden dowel and metal bolt connection according to the invention, adapted for use in a framework structure of built beams 1, 1a and trusses 2, 2a, Figure 4a being a cross section of the connecting means along C—D of Fig. 4, viewed from above.

Referring now in detail to Fig. 2, the dowel part is formed by a wooden cylinder having a cylindrical axial bore through its whole length and being cut obliquely from end to end of the bore whereby two complementary wedges 3 and 4 are obtained, the tails of which are partly cut away, as clearly shown in Fig. 2. Through the bore of the dowel passes an iron bolt 5 provided with head 7 and a screw nut 8 with respective washers 6. The oblique cut is clearly shown in Fig. 2a.

In order to connect the timbers 1 and 2 (Fig. 1), their pre-cut holes are brought into alignment and the wedges 3 and 4 are driven in so as to fit tightly. The cylinder is made so long that, when in position in the holes, the heads of its component wedges still protrude therefrom, the tail ends having been partly cut away, as stated before. Then, the cylindrical bolt 5 is driven into the bore of the cylinder so as also to fit tightly. Finally, the nut is screwed down on the threaded end of the bolt so that the nut and the bolt head with their washers sit firmly on the respective heads of the wedges, which makes the joint complete for use.

Whenever the joint becomes loose, in use, due to shrinkage of the wood as explained before, the nut 8 is screwed down further or "reset" on the threaded end of the bolt so that added pressure is brought to bear upon the protruding wedge heads, respectively, by the bolt head 7 with its washer 6 and by the nut 8 with its washer 6. Such pressure produces a relative movement of the wedges and of the bolt, the wedges being driven in deeper so as to progressively increase the total thickness of the dowel and bolt assembly and correspondingly increase to the desired degree the pressure to be exerted by the said assembly against the side walls of the aligned holes in the timbers. This permits an easy readjustment of the connecting means for controlling the pressure inside a joint and for re-tightening all the joints of the whole structure, whenever necessary.

Fig. 3 shows an arrangement similar to Fig. 2 excepting that the wooden cylinder is cut through its longitudinal axis into the two halves 3, 4 and that its bore is conical, the bolt 5 being correspondingly conical, but not, of course, its threaded end for the nut 8.

For connecting the timbers 1 and 2 (Fig. 1), in the same manner as explained with reference to Fig. 2, the two dowel halves 3, 4 are driven into aligned holes in the timbers, but so as not to protrude therefrom. The conical bolt 5, however, is long enough to still protrude from the hole when driven home. Finally, the nut 8 and washer 6 are fixed on the threaded end of the bolt 5 which makes the joint complete for use.

In this case, whenever the joint becomes loose in use, due to shrinkage, the nut 8 is reset by giving it a sufficient number of turns, whereby the bolt is drawn down deeper into the bore and due to its taper as described above it forces the dowel halves laterally apart as shown in Fig. 3a, thus increasing the total thickness of the dowel and bolt assembly inside the holes and increasing correspondingly the pressure against the side walls of the said holes. This, also, permits an easy readjustment of the connecting means, for controlling the pressure in a joint and effecting a retightening of the joints of the whole structure.

The connecting means shown in Fig. 4 while modified to adapt itself for use in framework structures, is based on the same inventive concept of the forms shown in Figs. 2 and 3. Here, also, we have two complementary wooden dowel parts 3, 4 and a metal bolt 5 passing through a longitudinal axial bore of the dowel parts and provided with head 7, nut 8 and respective washers 6. As, however, the connection points of the members 1, 2 and 1a, 2a respectively are at a distance from each other, the two conical dowel halves are each lodged individually in one of the two correspondingly cone-shaped holes cut through the timbers at their junctions. For the same reason, the iron bolt 5 is made long like a rod.

In framework structures of the kind in question, it may often be convenient, to use a suitably shaped metal sleeve or jacket 9, slit lengthwise into two halves, to provide for greater shearing strength, but it should be understood that this sleeve or jacket does not form part of the present invention and, in point of fact, has no function in the operation of the dowel and bolt arrangement as claimed.

After inserting the metal sleeve parts into the aligned holes in the framework structure, if considered necessary, the assembling of the interconnecting means according to the invention is effected similarly to the connecting means of Figs. 2 and 3. The conical dowel parts 3, 4 are inserted into their respective conical holes, but are each long enough still to protrude therefrom when driven home. Then the iron bolt or rod 5 is driven through the two holes and the nut 8 is screwed on to the threaded end of the bolt so that the nut 8 and bolt head 7 with their respective washers 6 sit firmly on the protruding portions of the dowel parts 3, 4. This completes the joint for use.

Upon loosening of the joint in use, due to shrinkage of the wood, the nut 8 is given a sufficient number of turns whereby the two dowel parts 3, 4 are pressed deeper into the holes in the timbers to be connected. This increases the total thickness of the dowel and bolt assembly inside the respective holes, the pressure against the side walls of the holes becoming correspondingly greater until the desired pressure is obtained. In this way, it is easy to readjust the parts of the connecting means, control the pressure in a joint and effect a re-tightening of the joints of the whole structure.

It is understood of course that modifications of the several parts constituting a joint according to the invention are possible insofar as they do not affect the operation of the connecting means as described and claimed. For instance, the cross section of the holes in the timbers and of the dowel parts of Figs. 2, 3 and 4, instead of being circular, as shown, may be rectangular or square and so also the cross section of the tapered bore of Fig. 3 and of the bolt 5 lodged therein. Furthermore, the non-operative ends of the dowel parts need not project from the holes in the timbers; they may be flush with the faces of the timbers or below level. If such a position is also desired for the operative ends of the dowel parts and of the bolt, these ends may be accommodated in cut-outs in the timber surfaces around the holes.

We claim:

A composite wood and metal means for interconnecting the wooden members of roof, bridge, and structures for large span, comprising timbers to be connected having aligned holes, a dowel of suitable cross section fitting tightly into the aligned holes in the timbers to be connected having a longitudinal axial bore and being cut obliquely from end to end of the bore so as to form two complementary wedges, the tails of the wedges being cut away and the heads of the wedges protruding from the said holes in the timbers, in combination with a threaded bolt which projects through the said bore of the dowel and which by its head and a nut screwed on to the projecting threaded end of the bolt, with washers placed under both head and nut, securely fastens the timbers together, the arrangement being such that upon subsequent loosening of the joint in use, due to shrinkage of the wood, a further screwing down of the nut will shift the two wedges lengthwise to each other, moving both deeper into the holes in the timbers so as to progressively increase the total thickness of the dowel and bolt assembly inside the holes and correspondingly increase the pressure exerted by the said assembly upon the side walls of the holes in the timbers, thus permitting at any time the readjustment of the connecting means for controlling the pressure in the joint to any desired degree and re-tightening the joints of the whole structure.

FRANCISCO JOSÉ HORATSCHKE.
ROLF WOLDEMAR HERING.

REFERENCES CITED

The following references are of record in the file of this patent:

UNITED STATES PATENTS

| Number | Name | Date |
|---|---|---|
| 981,385 | Cooper | Jan. 10, 1911 |
| 1,073,182 | Tissier | Sept. 16, 1913 |

FOREIGN PATENTS

| Number | Country | Date |
|---|---|---|
| 69,443 | Austria | July 26, 1915 |